United States Patent [19]

Grobbel

[11] Patent Number: 5,720,313
[45] Date of Patent: Feb. 24, 1998

[54] FLOW RATE CONTROL SYSTEM

[75] Inventor: Mark Edward Grobbel, Wyandotte, Mich.

[73] Assignee: Weiss Construction Co., Detroit, Mich.

[21] Appl. No.: 653,443

[22] Filed: May 24, 1996

[51] Int. Cl.$^6$ .................................................. G05D 7/06
[52] U.S. Cl. ...................... 137/10; 137/486; 137/487.5; 137/502
[58] Field of Search ........................... 137/486, 487.5, 137/502, 10

[56] References Cited

U.S. PATENT DOCUMENTS

| | | |
|---|---|---|
| 697,662 | 4/1902 | Reese . |
| 950,208 | 2/1910 | Ledoux ............................. 137/502 |
| 1,496,628 | 6/1924 | Hawley . |
| 1,673,041 | 6/1928 | Connet et al. ..................... 137/502 |
| 1,796,558 | 3/1931 | Browne . |
| 1,860,468 | 5/1932 | MacLean . |
| 1,869,144 | 7/1932 | Green et al. ................... 137/502 X |
| 1,934,713 | 11/1933 | Hughes ........................ 137/502 X |
| 1,934,759 | 11/1933 | Adelson ......................... 137/502 |
| 1,936,373 | 11/1933 | Adelson ..................... 137/502 X |
| 2,001,534 | 5/1935 | Hughes . |
| 2,014,968 | 9/1935 | Hughes . |
| 2,041,922 | 5/1936 | Green .............................. 137/486 |
| 2,207,921 | 7/1940 | Huxford ........................... 137/486 |
| 3,196,900 | 7/1965 | Catheron et al. ............... 137/486 X |
| 3,601,124 | 8/1971 | Petree . |
| 4,665,938 | 5/1987 | Brown et al. .................. 137/486 X |
| 4,721,131 | 1/1988 | Ciordinik et al. . |
| 4,838,309 | 6/1989 | Goodwin . |
| 4,901,751 | 2/1990 | Story et al. . |
| 4,933,516 | 6/1990 | Brown . |
| 5,020,773 | 6/1991 | Tuft et al. . |
| 5,427,137 | 6/1995 | Bowen . |
| 5,549,137 | 8/1996 | Lenz et al. ........................ 137/486 |

*Primary Examiner*—Gerald A. Michalsky
*Attorney, Agent, or Firm*—VanOphem Meehan & VanOphem, P.C.

[57] ABSTRACT

A system for controlling the rate of flow of a liquid in a liquid flow system, especially a system for controlling the rate of flow of treated water in a municipal water treatment and pumping system, the flow control system utilizing a venturi (10) having an inlet (12), a restricted throat (14) and a diffuser (16) through which the liquid flow is in series. The rate of flow of liquid through the venturi is adjusted by a flow rate control valve (18) in fluid communication with the diffuser of the venturi, and the flow control valve has a spool (22) that moves linearly to selectively permit a variable volume of liquid to flow through the valve into an outlet main (20). The movement of the spool is actuated by an electrically operated linear actuator (44) that operates in response to an electrical signal from a digital controller (40), which is indicative of a pressure differential between liquid pressure at the inlet of the venturi and liquid pressure at the throat. A set point adjustment device (46) is provided to adjust the set point of the rate at which the linear actuator operates to actuate the position of the spool of the flow control valve.

8 Claims, 2 Drawing Sheets

FLOW RATE CONTROL SYSTEM

BACKGROUND OF THE INVENTION

1. Field of the Invention

This invention relates to a system for controlling the rate of flow of liquid through a liquid filtering system. More particularly, this invention relates to a system for controlling the rate of flow of water through a filtering system in a municipal or other water treatment and distribution system.

2. Description of the Prior Art

A typical municipal water treatment and pumping plant will incorporate one or more, and frequently many, water filtering devices. Each such water filtering device is usually very large, for example, having a flow or filtering capacity of up to 7 million gallons per day. Because the capacity demand on a typical municipal water treatment plant varies greatly from season of the year to season, and even during a day based on the time of day, it is quite important to be able to accurately vary the output of a filtering device over rather large limits. Moreover, even in a filtering station with many such filtering devices, and in a major metropolitan area it is known to use 200 or more such filtering devices in a water treatment and pumping plant, it is desirable to continuously operate each filtering device, even at a very low output level, to avoid the need to rechloronate the treatment bed, which is required whenever a filtration device is stopped before it can be restarted. This characteristic, then, as a practical matter, precludes the shutting down of filtration devices during times of low demand to avoid the need to unduly cut back on the output of devices that remain in operation.

Control of the output of a filtering device in a municipal water treatment and pumping station is further complicated by the variations in the flow differential each such filtering device experiences during a finite duration of operation, often called a "filter run," due to the varying levels of inlet pressure, outlet pressure, and resistance of the water treatment filter bed, from which the flow control device receives treated water, due to the gradual clogging of the filter bed over the course of the filter run, which typically is approximately 60–70 hours in duration.

A typical municipal water treatment plant filtering system incorporates a venturi in its flow path. The venturi has an inlet that receives filtered water, a restricted throat, and an outlet or diffuser section that gradually increases in diameter from the throat. A spool valve is positioned at the outlet of the venturi and the position of a movable member relative to a fixed member of the spool valve controls the rate at which water can flow from the outlet of the venturi into a treatment plant outlet main.

The velocity at which water will flow through the venturi will vary significantly from the inlet to the venturi to the throat, due to the fact that the inner diameter of the throat is substantially less than that of the venturi inlet. This phenomenon will create a pressure differential between the pressure at the inlet to the venturi and the pressure at its throat, and this pressure differential is often used to control the movement of the spool of the outlet valve by imposing pressure signals from the inlet and throat on opposite sides of the flexible membrane in a governor with a stem that acts linearly on the outlet valve spool. However, even with a governor with a very large flexible membrane, the force differential on the outlet valve spool resulting from the pressure differential of the venturi is frequently inadequate to control the flow through the venturi within sufficiently precise limits. Thus, it has been known to assist the positioning of the outlet valve spool by a counterweight that acts on the valve operator. Unfortunately, the counterweight must be manually repositioned quite frequently during a filter run due to variable operating conditions experienced by the filtering device, especially due to the clogging of a filter during a filter run, and such repositioning of the counterweight is often quite difficult since the counterweight is often positioned at a location that is not readily accessible to an operator, thus resulting in a filtration device output that is not controlled to within desirable limits.

SUMMARY OF THE INVENTION

According to the present invention there is provided a control system for controlling, to within very narrow limits, the flow rate of filtered liquid within a liquid filtering system, especially the flow rate of water in a water treatment and pumping station. The control system of the present invention utilizes a venturi through which the liquid flows, a spool valve near the outlet of the venturi for limiting the output of the venturi and a regulator with a flexible diaphragm that is connected to the spool valve for repositioning the spool valve from time to time as required to adjust the flow rate from the venturi. Opposite sides of the flexible diaphragm of the regulator are pressurized by pressure signals from the inlet and the throat of the venturi, respectively, and the difference between the pressures at these locations, which results from the differences in the internal diameters of the venturi and the differences in flow velocity resulting therefrom, is a measure of flow rate through the venturi, and is used to provide at least a rough measure of control of the flow rate.

To more positively assist in the accurate repositioning of the spool of the venturi outlet flow control valve, and thereby more accurately control the flow rate through the venturi, the pressure signals from the venturi inlet and throat are also imposed on a digital controller to convert the difference in the pressure values, which is a measure of flow rate through the venturi, into an electrical signal. The electrical signal, in turn, is used to control the operation of a linear actuator, which is connected to the stem of the spool valve and positively assists in the repositioning of the spool valve whenever the flow rate through the venturi is to be adjusted. The repositioning of the venturi flow rate control valve, thus, is much more positively controlled when a control system of the present invention is employed than was the case with prior art systems that operated only by the flexing of a diaphragm of a pressure differential regulator in response to the difference in pressures between the pressure at the inlet to a venturi and the pressure at the throat of the venturi. Further, the digital controller which is used to control the operation of the linear actuator can be positioned much more closely to the operator than a counterweight acting on the spool valve stem as is characteristic of prior art flow control systems, thus making it easier to change the flow rate set point to which the linear actuator controls the venturi outlet flow control valve, and to do so with greater frequency.

Accordingly, it is an object of the present of the invention to provide an improved control system for controlling the rate of flow of a liquid in a liquid filtering system, and it is a corollary object to provide a control system of such character for controlling the rate of flow of water in a municipal water treatment and pumping station. More particularly, it is an object of the present invention to provide a control system that is capable of more precisely controlling the rate of flow of liquid in a liquid filtering system, and it is a corollary object to provide such a control system for controlling the rate of flow of water in a municipal water treatment and pumping station.

For a further understanding of the present invention and the objects thereof, attention is directed to the drawing and the following brief description thereof, to the detailed description of the preferred embodiment of the invention and to the appended claims.

DETAILED DESCRIPTION OF THE PREFERRED EMBODIMENT

Figure 1:
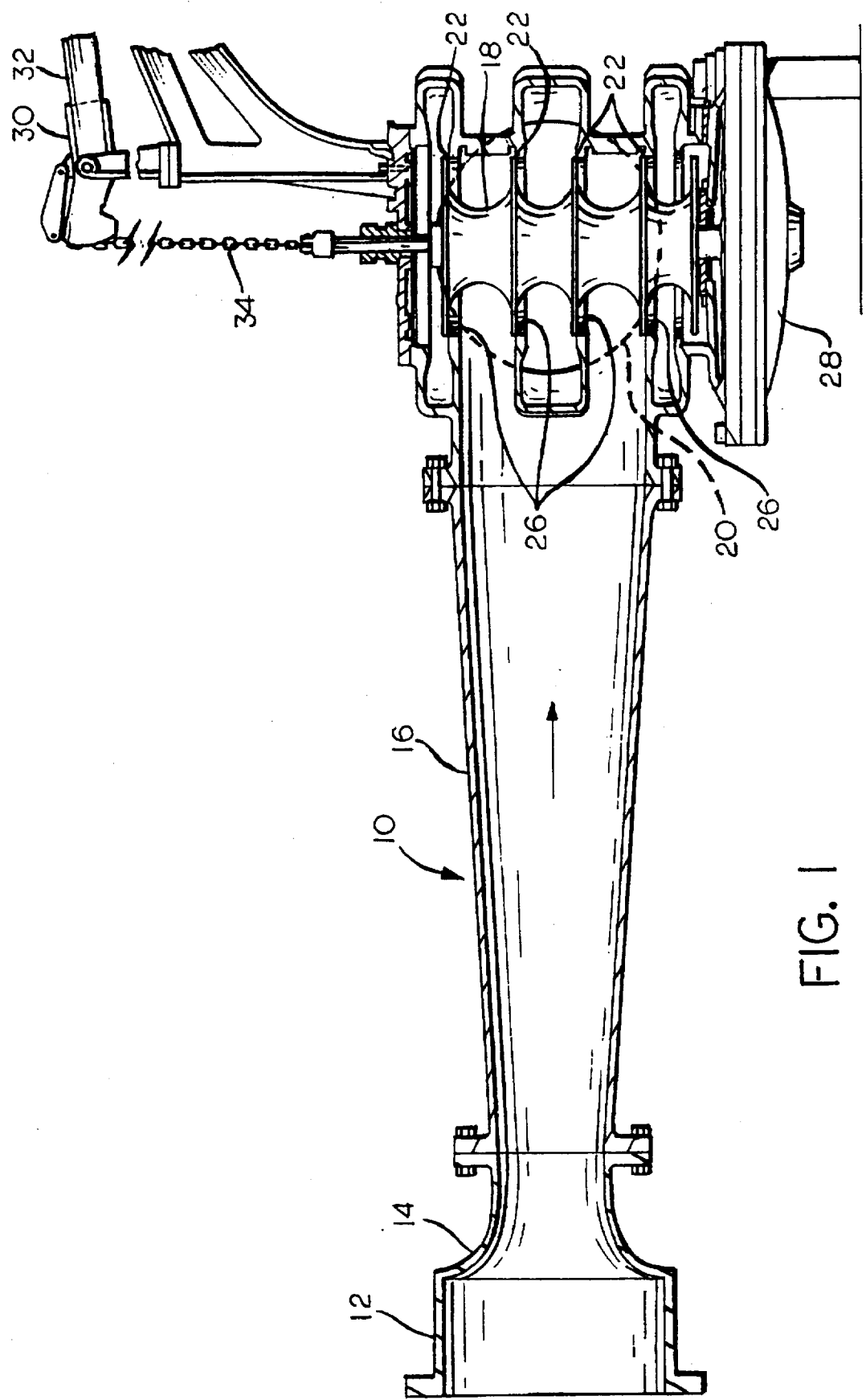
FIG. 1 is an elevational view, in cross section, of a flow rate control venturi, with a flow rate control outlet valve, to which the control system of the present invention is applicable.

A liquid flow rate control venturi to which the control system of the present invention is applicable is generally indicated by reference numeral 10 in the drawing, and is made up of an inlet 12, a restricted throat 14, and a diffuser section 16, in serial fluid communication with one another. The inner diameter of the restricted throat 14 is substantially smaller than the inlet 12, and the diameter of the diffuser section 16 increases gradually from that of the throat 14 to a final outlet diameter, which is in fluid communication with a flow rate control valve 18 of the spool type. In a typical water treatment and pumping station, the venturi 10 is aligned with its longitudinal central axis extending horizontally, and the control valve 18 is aligned with its axis of movement extending vertically. In any case, the control valve 18 operates to control the flow of liquid from the venturi 10 into an outlet main 20, whose longitudinal central axis also extends horizontally in a water treatment and pumping station, and typically at right angles to that of the venturi 10. In a typical water treatment and pumping station, the venturi 10 will be sized to accommodate a flow rate of 5 million gallons per day, or even more, but must be capable of being throttled back from its maximum flow rate quite substantially, during seasonal or daily periods of low demand on the water treatment and filtering system in which it is utilized.

The flow rate control valve 18 has a vertically reciprocable spool member 22 with a vertically spaced apart series of horizontally extending lands 24. The lands 24 are positioned to align with, or be in a fixed distance of misalignment with, openings 26 in the diffuser section 16 of the venturi 10 that communicate with the outlet main 20, and the position of the lands 24 with respect to the openings 26 determines the rate at which liquid can flow through the venturi 10 into the outlet main 20. This flow rate is varied by varying the vertical position of the spool member 22, and is typically done by a pressure regulator 28 that is vertically aligned with the spool member 22 and directly coupled thereto. The pressure regulator 28 is a known type that has a flexible diaphragm (not shown) extending thereacross, and opposite sides of the flexible diaphragm are pressurized by pressure signals (not shown) from the inlet 12 and the throat 14 of the venturi 10, respectively. In the illustrated configuration of the pressure regulator 28 relative to the flow rate control valve 18, the pressure signal from the inlet 12 of the venturi 10 will act on the top side of the pressure regulator 28, and the pressure signal from the throat 14 of the venturi 10 will act on the bottom side of the pressure regulator 28.

Because of the differences in the internal diameter of the venturi 10 between that at the inlet 12 and that at the throat 14, the velocity of liquid flowing through the venturi 10 will be substantially higher at the throat 14 than at the inlet 12, since the flow rate, in gallons per hour, will be the same at both locations. Due to the Bernoulli effect, the pressure at the throat 14 will be less than that at the inlet 12, as is understood in the art. Thus, a pressure differential will exist across the diaphragm of the pressure regulator 28, and this pressure differential is used to control the position of the spool member 22 to maintain a constant flow rate through the venturi 10. A counterweight assist of variable magnitude can be provided to assist the pressure regulator 28 in controlling the position of the spool member 22 by releasably securing a counterweight 30 on a pivoted arm 32 from which the spool member 22 is suspended by a flexible chain 34. Thus, by varying the position of the counterweight 30 on the pivoted arm 32, which is usually accomplished manually, the set point at which the pressure regulator 28 controls the rate of flow through the venturi 10 by controlling the position of the spool member 22 can be varied.

A system as heretofore described, however, is not capable of being controlled within desired limits at any particular set point, and it is often quite difficult to vary the set point by repositioning the counterweight 30 on the pivoted arm 32, since such repositioning must be accomplished manually and often only at a location that is not readily accessible to an operator. To overcome these problems, the pressure signals from the inlet 12 and the throat 14 of the venturi 10, which may be taken from taps corresponding to the taps 36, 38, respectively, (FIG. 2) from which the pressure signals to the pressure regulator are taken, are imposed on a microprocessor-based controller 40, after passing through a conventional flow rate measuring and indicating cell 42, if desired. The controller 40 is preferably of a type marketed by The Foxboro Company under the designation 743 CB Series Field Station Micro Controller, as described in their Product Specifications PSS 2C-1A9 B, the disclosure of which is incorporated by reference herein. The output of the controller 40 is an electrical signal that is proportional to the pressure differential between the pressure at the inlet 12 of the venturi 10 and that at the throat 14, and controls the operation of a linear actuator 44 that acts on the pivoted arm 32 through a pivoted joint 52 to positively position the spool member 22 of the flow rate control valve 18, and specifically the positions of the lands 24 thereof relative to the openings 26, with an assist from the pressure regulator 28. Preferably, a set point adjustment device 46 is positioned between the controller 40 and the linear actuator 44 to permit adjustment in the flow rate at which the controller 40 controls the operation of the linear actuator 44. The counterweight 30 preferably is continued to be used with the system of FIG. 2, preferably in conjunction with a position adjustable counterweight 48 on an extension 50 of the pivoted arm 32, so that the counterweights 30 and 48 act on opposite sides of a pivot 56 about which the pivoted arm 32 pivots, to minimize the axial loads on the linear actuator 44 insofar as is desired.

Figure 2:
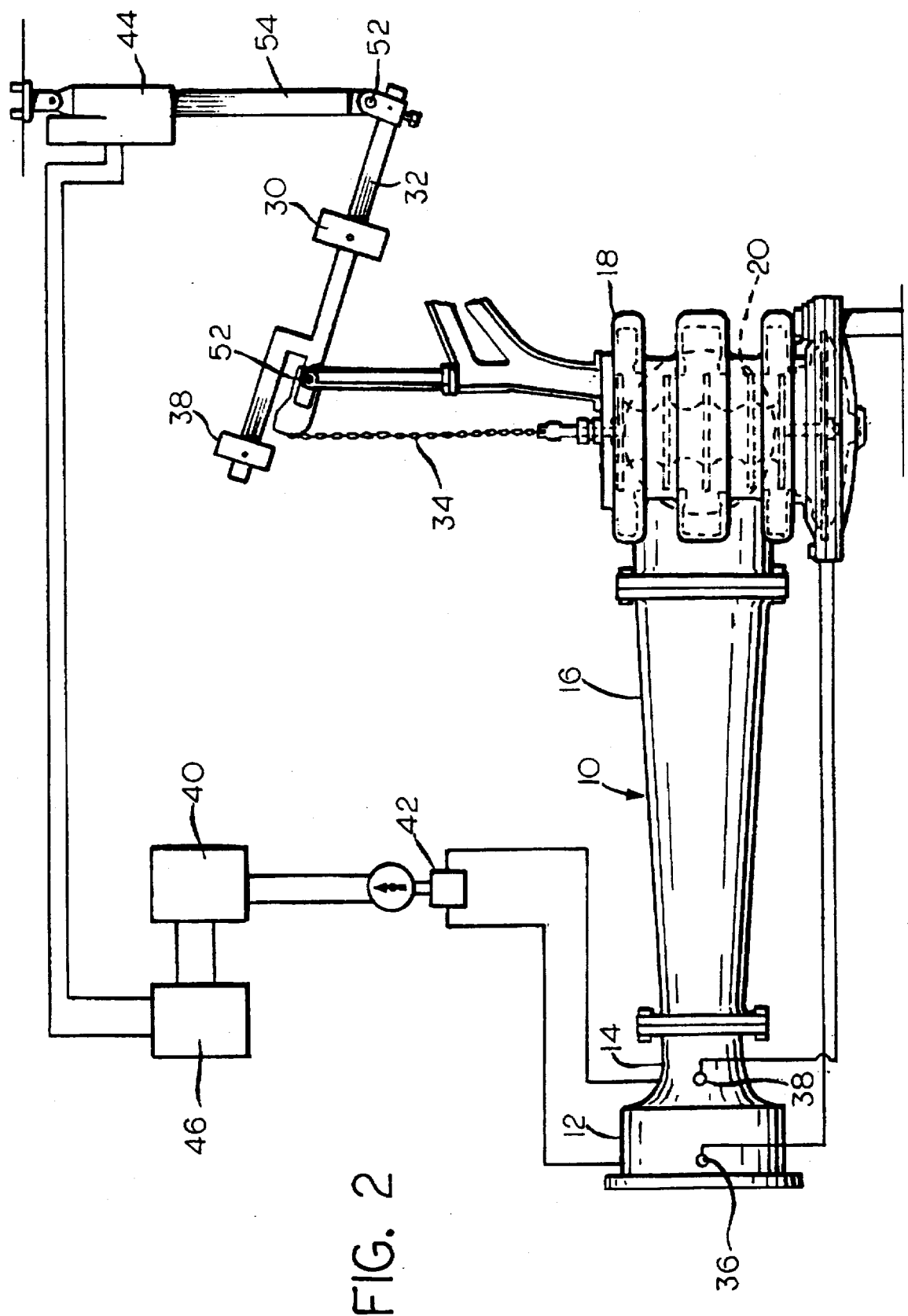
FIG. 2 is a schematic view of the control system of the preferred embodiment of the present invention, as applied to a venturi of the type illustrated in FIG. 1.

The linear actuator 44 is preferably of a type marketed by Jordan Controls, Inc., of Milwaukee, Wis., under their LA-2400 Series, and specifically their EK Series as described in their Bulletin No. J-545, the disclosure of which is also incorporated by reference herein. The positive displacement of an actuating element 54 of the linear actuator 44, as controlled by the controller 40, results in a much more precise positioning of the spool member 22 of the flow rate control valve 18 relative to the openings 26 of the flow rate control valve 18 than is possible to obtain solely from a differential pressure regulator such as the pressure regulator 28, even with an assist from a counterweight 30 acting on a pivoted arm 32. In practice, it has been found that a system of the type illustrated in FIG. 2 is capable of controlling the flow rate through a venturi in a water treatment and pumping station at a rate that is within one percent of its desired flow rate, whereas a system of the type illustrated in FIG. 1, without the positive control of the position of the spool member 22 of the flow control valve that can be obtained with a controller 40 controlling the operation on the linear actuator 44, cannot routinely be controlled at a level that differs from its desired level by as much as seven percent.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. In a liquid flow system, an apparatus for controlling the rate of liquid flow through the system, said apparatus comprising:

a venturi through which the liquid flows, said venturi comprising an inlet, a throat and a diffuser through which the liquid flows from said inlet through said throat and then through said diffuser, said throat having an internal diameter that is less than an internal diameter of said inlet:

flow rate control valve means in fluid communication with said diffuser of said venturi for controlling the rate of liquid flow through said venturi, said flow rate control valve means having a linearly operating member;

means for measuring a differential in pressure between the pressure of liquid flowing through said inlet and the pressure of liquid flowing through said throat;

means for converting a signal indicative of the differential in pressure into an electrical control signal;

linear actuator means responsive to the electrical control signal for linearly moving said linearly operating member of said flow rate control valve means to control the rate of liquid flowing through said venturi at a predetermined value; and set point adjustment means electrically connected to said means for converting and said linear actuator means for adjusting the predetermined value at which said linear actuator means operates to control the rate of liquid flowing through said venturi;

wherein said linearly operating member of said flow rate control valve means operates in a substantially vertical direction, wherein said linear actuator means comprises a linearly movable member that moves in a substantially vertical direction, and further comprising:

an arm having first and second ends; and pivot means for pivotally mounting said arm at a location between said first and second ends; and said linearly movable member of said linear actuator means being pivotally connected to said arm at a location adjacent one of said first and second ends, said linearly operating member of said flow rate control valve means being pivotally connected to said arm at a location adjacent the other of said first and second ends.

2. Apparatus for controlling the rate of liquid flow through a liquid flow control system according to claim 1 and further comprising:

a counterweight slidably carried on said arm between said pivot means and said one of said first and second ends.

3. Apparatus for controlling the rate of liquid flow through a liquid flow control system according to claim 2 wherein said arm comprises an extension extending from said other of said first and second ends, and further comprising:

a second counterweight slidably carried on said extension between said pivot means and a free end of said extension.

4. In a liquid flow system, an apparatus for controlling the rate of liquid flow through the system, said apparatus comprising:

a venturi through which the liquid flows, said venturi comprising an inlet, a throat and a diffuser through which the liquid flows from said inlet through said throat and then through said diffuser, said throat having an internal diameter that is less than an internal diameter of said inlet;

flow rate control valve means in fluid communication with said diffuser of said venturi for controlling the rate of liquid flow through said venturi, said flow rate control valve means having a linearly operating member;

means for measuring a differential in pressure between the pressure of liquid flowing through said inlet and the pressure of liquid flowing through said throat;

means for converting a signal indicative of the differential in pressure into an electrical control signal;

linear actuator means responsive to the electrical control signal for linearly moving said linearly operating member of said flow rate control valve means to control the rate of liquid flowing through said venturi at a predetermined value;

set point adjustment means electrically connected to said means for converting and said linear actuator means for adjusting the predetermined value at which said linear actuator means operates to control the rate of liquid flowing through said venturi;

pressure regulator means having a flexible diaphragm extending therethrough, said pressure regulating means having a linearly acting member connected to said flexible diaphragm that linearly acts on said linearly operating member of said flow rate control valve means;

means for transmitting a signal responsive to liquid pressure at said inlet of said venturi to one side of said flexible diaphragm; and means for transmitting a signal responsive to liquid pressure at said throat of said venturi to another side of said flexible diaphragm.

5. Apparatus according to claim 4 wherein:

said flow rate control valve means comprises a linearly acting spool member with a spaced apart series of horizontally extending lands, each of said lands being positioned to align with, or be in a fixed distance of misalignment with, openings in said diffuser of said venturi.

6. Apparatus according to claim 5 wherein:

said means for converting comprises a microprocessor-based controller.

7. Apparatus according to claim 6 wherein:

said linearly acting spool member acts along an axis of motion;

said venturi has a liquid flow axis extending therethrough; and said axis of motion of said linearly acting spool member extends generally perpendicularly to said liquid flow axis.

8. A method of controlling the rate of flow of a liquid through a liquid flow system, said method comprising the steps of:

- causing the liquid to flow through a venturi having an inlet, a restricted throat, and a diffuser in serial fluid communication with one another;
- providing a liquid flow control valve with a position adjustable member to control the rate at which liquid can flow through the venturi;
- measuring a pressure differential between the pressure of liquid flowing through the inlet and the pressure of liquid flowing through the restricted throat of the venturi;
- converting the pressure differential to an electrical signal;
- providing an actuator with a positively displaceable member for adjusting the position of the position adjustable member of the liquid flow control valve;
- using the electrical signal to control the position of the positively displaceable member of the actuator to thereby control the rate of flow of liquid through the venturi at a predetermined value;
- providing set point adjustment means for adjusting the predetermined value at which the electrical signal controls the position of the position adjustable member of the liquid flow control valve, and thereby the predetermined value at which the liquid flow control valve controls the rate of flow through the venturi;
- providing a pressure regulator with a flexible diaphragm extending thereacross and a member connected to the flexible diaphragm and movable in a linear direction on the flexing of the flexible diaphragm to assist in moving the position of the position adjustable member of the liquid flow control valve in the linear direction;
- imposing a first pressure signal indicative of the pressure of liquid flowing through the inlet of the venturi on one side of the flexible diaphragm; and
- imposing a second pressure signal indicative of the pressure of liquid flowing through the restricted throat of the venturi on an opposed side of the flexible diaphragm.

* * * * *